(12) United States Patent
Williams et al.

(10) Patent No.: US 7,278,683 B2
(45) Date of Patent: Oct. 9, 2007

(54) CHILD SEAT WITH OBJECT HOLDER

(75) Inventors: Bruce Williams, Denver, PA (US);
Daniel J. Brunick, Birdsboro, PA (US);
Charles E. Crane, Coatesville, PA (US)

(73) Assignee: Graco Children's Products, Inc.,
Exton, PA (US)

( * ) Notice: Subject to any disclaimer, the term of this patent is extended or adjusted under 35 U.S.C. 154(b) by 0 days.

(21) Appl. No.: 10/691,618

(22) Filed: Oct. 24, 2003

(65) Prior Publication Data

US 2004/0090094 A1    May 13, 2004

Related U.S. Application Data

(62) Division of application No. 10/072,601, filed on Feb. 11, 2002.

(51) Int. Cl.
*A47D 1/10* (2006.01)

(52) U.S. Cl. .............................. 297/250.1; 297/188.08; 297/188.11

(58) Field of Classification Search ........... 297/188.11, 297/188.13, 188.16, 188.08, 250.1, 463.1–463.2, 297/188.01, 188.15, 188.17; 248/311.2
See application file for complete search history.

(56) References Cited

U.S. PATENT DOCUMENTS

| | | | |
|---|---|---|---|
| 2,635,680 A | | 4/1953 | Zentmire |
| 3,136,578 A | * | 6/1964 | Tihovici ................ 297/188.16 |
| 3,475,052 A | | 10/1969 | Kaposi |
| 3,637,184 A | | 1/1972 | O'Brien |
| 4,434,961 A | | 3/1984 | Hoye |
| 4,527,830 A | | 7/1985 | Meyers |
| 4,557,452 A | | 12/1985 | Khuong |
| 4,560,128 A | | 12/1985 | Willeby et al. |
| 4,606,523 A | | 8/1986 | Statz et al. |
| 4,715,652 A | | 12/1987 | Ward |
| 4,728,147 A | | 3/1988 | Dutton |
| 4,733,908 A | | 3/1988 | Dykstra et al. |
| 4,759,584 A | | 7/1988 | Dykstra et al. |
| 4,767,155 A | | 8/1988 | Kousaka et al. |
| 4,773,703 A | | 9/1988 | Krugener et al. |

(Continued)

FOREIGN PATENT DOCUMENTS

DE        42 04 232 A1    9/1992

(Continued)

OTHER PUBLICATIONS

MAXI-COSI, Maxi-Cosi Rodi Car Seat Brochure, date undetermined, 2 pp., Maxi Miliaan B.V.

(Continued)

*Primary Examiner*—David Dunn
*Assistant Examiner*—Erika Garrett
(74) *Attorney, Agent, or Firm*—Lempia Forman LLC

(57) ABSTRACT

An adjustable child seat includes a backrest and a seat base and may be used with or without the backrest. The child seat includes adjustable arm rests. The height of the backrest and the depth of the seat base are also adjustable. The connection between the backrest and the seat base is configured to prevent unintentional separation but allows simple and intuitive separation when desired. A belt guide operating in either a seat belt locking mode or a seat belt free mode is also provided.

28 Claims, 14 Drawing Sheets

U.S. PATENT DOCUMENTS

| | | | |
|---|---|---|---|
| 4,799,638 A | 1/1989 | Allen | |
| 4,799,731 A | 1/1989 | Brown | |
| 4,818,017 A | 4/1989 | Dykstra et al. | |
| 4,828,211 A | 5/1989 | McConnell et al. | |
| 4,844,400 A | 7/1989 | Jasmagy, Jr. | |
| 4,852,941 A * | 8/1989 | Jones | 297/188.01 |
| 4,883,317 A * | 11/1989 | Davenport | 297/188.1 |
| 4,915,447 A | 4/1990 | Shovar | |
| 4,927,200 A | 5/1990 | Wilkins | |
| 4,942,827 A | 7/1990 | Norgaard | |
| 4,943,111 A | 7/1990 | VanderLaan | |
| 4,948,197 A | 8/1990 | Sansing | |
| 4,951,997 A | 8/1990 | Kenney | |
| 5,007,610 A | 4/1991 | Christiansen et al. | |
| 5,007,612 A | 4/1991 | Manfre | |
| 5,035,464 A | 7/1991 | Spallholtz | |
| 5,042,875 A | 8/1991 | Biggs, Sr. | |
| 5,060,899 A | 10/1991 | Lorence et al. | |
| 5,072,909 A | 12/1991 | Huang | |
| 5,106,046 A | 4/1992 | Rowles et al. | |
| 5,110,184 A | 5/1992 | Stein et al. | |
| 5,131,716 A | 7/1992 | Kwasnik et al. | |
| 5,143,337 A | 9/1992 | Tomayko, Jr. et al. | |
| 5,150,946 A | 9/1992 | Marfilius et al. | |
| 5,195,711 A * | 3/1993 | Miller et al. | 248/311.2 |
| 5,199,678 A | 4/1993 | Luebke | |
| 5,217,277 A * | 6/1993 | Rasnick et al. | 297/145 |
| 5,232,190 A | 8/1993 | Gould | |
| 5,248,183 A * | 9/1993 | Gignac et al. | 297/188.16 |
| 5,257,765 A | 11/1993 | Halle | |
| 5,259,580 A | 11/1993 | Anderson et al. | |
| 5,286,084 A | 2/1994 | Bart | |
| 5,289,962 A | 3/1994 | Tull et al. | |
| 5,290,092 A | 3/1994 | Geer | |
| 5,295,650 A | 3/1994 | Brandt | |
| 5,326,064 A | 7/1994 | Sapien | |
| 5,330,146 A | 7/1994 | Spykerman | |
| 5,332,286 A | 7/1994 | Atherton et al. | |
| 5,356,107 A | 10/1994 | Sinohuiz | |
| 5,358,307 A * | 10/1994 | Shafer et al. | 297/188.2 |
| 5,382,079 A | 1/1995 | Wilson et al. | |
| 5,395,085 A | 3/1995 | Mann | |
| 5,397,089 A | 3/1995 | Kataoka | |
| 5,466,043 A | 11/1995 | Lambert et al. | |
| 5,487,519 A | 1/1996 | Grabowski | |
| 5,489,054 A | 2/1996 | Schiff | |
| 5,494,249 A | 2/1996 | Ozark et al. | |
| 5,505,519 A * | 4/1996 | Natt | 297/250.1 |
| 5,520,436 A * | 5/1996 | Rader et al. | 297/188.11 |
| 5,524,957 A | 6/1996 | Gibriano | |
| 5,524,958 A | 6/1996 | Wieczorek et al. | |
| 5,527,008 A * | 6/1996 | Schutter et al. | 248/311.2 |
| 5,533,785 A | 7/1996 | Gould | |
| 5,560,680 A | 10/1996 | Salvador et al. | |
| 5,584,453 A | 12/1996 | Morter | |
| 5,586,804 A * | 12/1996 | Burroughs | 297/188.08 |
| 5,586,806 A | 12/1996 | Hergott | |
| 5,611,513 A | 3/1997 | Rosen | |
| 5,615,925 A | 4/1997 | Kain | |
| 5,618,018 A | 4/1997 | Baniak | |
| 5,628,486 A | 5/1997 | Rossman et al. | |
| 5,647,638 A | 7/1997 | Ritt et al. | |
| 5,649,737 A | 7/1997 | Behnke | |
| 5,662,378 A | 9/1997 | Carruth | |
| 5,685,604 A | 11/1997 | Kain | |
| 5,690,308 A | 11/1997 | Jankovic | |
| 5,700,051 A * | 12/1997 | Newhouse | 297/188.11 |
| 5,720,516 A | 2/1998 | Young | |
| 5,746,363 A | 5/1998 | Teller et al. | |
| 5,779,302 A | 7/1998 | Geier et al. | |
| 5,788,324 A | 8/1998 | Shea et al. | |
| 5,791,616 A | 8/1998 | Volkmann et al. | |
| 5,800,011 A | 9/1998 | Spykerman | |
| 5,865,412 A | 2/1999 | Mason | |
| 5,876,007 A * | 3/1999 | Lancaster et al. | 248/311.2 |
| 5,897,089 A * | 4/1999 | Lancaster et al. | 248/311.2 |
| 5,947,554 A | 9/1999 | Mashkevich | |
| 5,964,502 A | 10/1999 | Stephens | |
| 5,967,602 A * | 10/1999 | Ptak et al. | 297/188.11 |
| 5,984,251 A | 11/1999 | Davis | |
| 5,997,080 A * | 12/1999 | Newhouse et al. | 297/188.11 |
| 6,010,104 A | 1/2000 | Hanson et al. | |
| 6,019,334 A | 2/2000 | Shinomiya | |
| 6,024,411 A | 2/2000 | Pesta et al. | |
| 6,045,184 A | 4/2000 | Nakagawa | |
| 6,065,729 A | 5/2000 | Anderson | |
| 6,074,000 A * | 6/2000 | Wagner | 297/188.11 |
| 6,105,917 A | 8/2000 | Yabuya et al. | |
| 6,142,574 A | 11/2000 | Alexander | |
| 6,145,931 A * | 11/2000 | Subotic | 297/423.2 |
| 6,158,180 A | 12/2000 | Edwards | |
| 6,220,660 B1 | 4/2001 | Bedro et al. | |
| 6,227,510 B1 | 5/2001 | McMullen, Sr. | |
| 6,227,619 B1 | 5/2001 | Pesta et al. | |
| 6,250,527 B1 | 6/2001 | Mizue et al. | |
| 6,253,975 B1 | 7/2001 | Ichioka et al. | |
| 6,260,663 B1 | 7/2001 | Combs | |
| 6,260,865 B1 | 7/2001 | Yacobi et al. | |
| 6,264,273 B1 | 7/2001 | Waters, Sr. | |
| 6,267,446 B1 * | 7/2001 | Wieland et al. | 297/440.13 |
| 6,302,033 B1 | 10/2001 | Roudebush | |
| 6,338,529 B1 | 1/2002 | David et al. | |
| 6,343,837 B1 | 2/2002 | Gage | |
| 6,390,547 B1 * | 5/2002 | Spykerman | 297/188.1 |
| 6,450,468 B1 * | 9/2002 | Hamamoto | 248/311.2 |
| 6,478,372 B1 | 11/2002 | Lemmeyer et al. | |
| 6,478,377 B2 * | 11/2002 | Kassai et al. | 297/256.1 |
| 6,491,343 B2 * | 12/2002 | Yamazaki | 297/250.1 |
| 6,520,575 B1 * | 2/2003 | Yuzawa | 297/188.01 |
| 6,550,862 B2 * | 4/2003 | Kain | 297/250.1 |
| 6,612,649 B2 | 9/2003 | Kain | |
| 6,644,523 B1 * | 11/2003 | Salas | 224/275 |
| 6,997,509 B2 * | 2/2006 | Kain | 297/250.1 |

FOREIGN PATENT DOCUMENTS

| | | |
|---|---|---|
| DE | 42 28 848 C1 | 9/1993 |
| DE | 43 29 755 A1 | 3/1995 |
| DE | 55 29 698 A2 | 11/1995 |
| DE | 197 26 680 A1 | 1/1999 |
| DE | 197 55 526 A1 | 2/1999 |
| EP | 0 056 614 A2 | 7/1982 |
| EP | 0 121 899 A2 | 10/1984 |
| EP | 0 302 607 A2 | 2/1989 |
| EP | 0 326 265 B1 | 8/1989 |
| EP | 0 751 033 B1 | 1/1997 |
| FR | 2 816 558 A3 | 5/2002 |
| GB | 2 271 927 A | 8/1924 |
| GB | 220 848 | 8/1924 |
| GB | 2 194 305 A | 3/1988 |
| GB | 2 220 848 A | 1/1990 |
| GB | 2 266 839 A | 11/1993 |
| GB | 2 271 927 A | 5/1994 |
| GB | 2 298 655 A | 7/1995 |
| GB | 2 362 094 A | 11/2001 |
| GB | 2 363 064 A | 12/2001 |
| GB | 2 366 194 A | 3/2002 |
| GB | 2 375 330 A | 11/2002 |
| JP | 6-284940 | 10/1994 |
| JP | 7-323724 | 12/1995 |
| JP | 8-127279 | 5/1996 |
| JP | 10119620 A | 5/1998 |
| JP | 2001-39201 | 2/2001 |
| NL | 1011880 | 10/2000 |

| WO | WO93/22954 | 11/1993 |
| WO | WO98/25788 A1 | 6/1998 |

OTHER PUBLICATIONS

AKTA, AKTA Car Seat Instruction Manual, date undetermined, 12 pp., AKTA.
BEBE Comfort, Hipsos Car Seat Instruction Manual, date undetermined, 8 pp., Ampafrance S.A.
MAXI-COSI, Maxi-Cosi Rodi Car Seat Instruction Manual, date undetermined, 34 pp., Maxi Miliaan B.V.
RECARO, Recaro Start Car Seat Instruction Manual, date undetermined, 13 pp., Recaro North America.
EVENFLO, Evenflo RightFit™ Car Seat Instruction Manual, Jul. 1996, 7 pp., Evenflo.
BRITAX, Britax Roadster™ Belt Positioning Booster Seat instruction Manual, Jan. 2001, 20 pp., Britax Child Safety Inc.
Concord, Concord I₂MAGE Car Seat Instruction Manual, date undetermined, 52 pp. Concord GmbH.
APRICA, Aprica Car Seat Instruction Manual, date undetermined, 24 pp., Aprica.
Jane, Jane Bodyguard Car Seat Instruction Manual, date undetermined, 2 pp., Jane, S.A.
Photographs of Aprica Car Seat, date undetermined, 2 pp.
Photographs of BeBeComfort Car Seat, date undetermined, 2 pp.
Photographs of Britax Car Seat, date undetermined, 3 pp.
Photographs of Concord Car Seat, dated undetermined, 5 pp.
Photographs of Fisher Price Car Seat, date undetermined, 2 pp.
Photographs of Jane Car Seat, date undetermined, 2 pp.
Photographs of Century Next Step Car Seat, date undetermined, 4 pp.
Photographs of Recaro Car Seat, date undetermined, 3 pp.
Great Britain Search Report of GB 0514225.2, dated Oct. 25, 2005.
Great Britain Search Report of GB 0514224.5, dated Oct. 25, 2005.
*Memorandum in Support of the Motion of Defendant Graco Children's Products, Inc. for Summary Judgment of Non Infringement*, filed Jan. 5, 2004 in the U.S. District Court for the Southern District of Indiana, *Dorel Juvenile Group, Inc.* vs. *Graco Children's Products, Inc.*
Photograph of portion of Century child seat, Sep. 30, 1999, 1 pp.
Drawing of portion of overhead shield of Century child seat, Sep. 28, 1999, 1 pp.
Futura 20/60 car seat advertisement, Fisher Price Limited, 1999, 2 pp.
Advertisement from amazon.com for Futura 20/60 car seat, 2 pp.
Advertisement from DmartExpress.com for Futura 20/60 car seat, 2 pp.

* cited by examiner

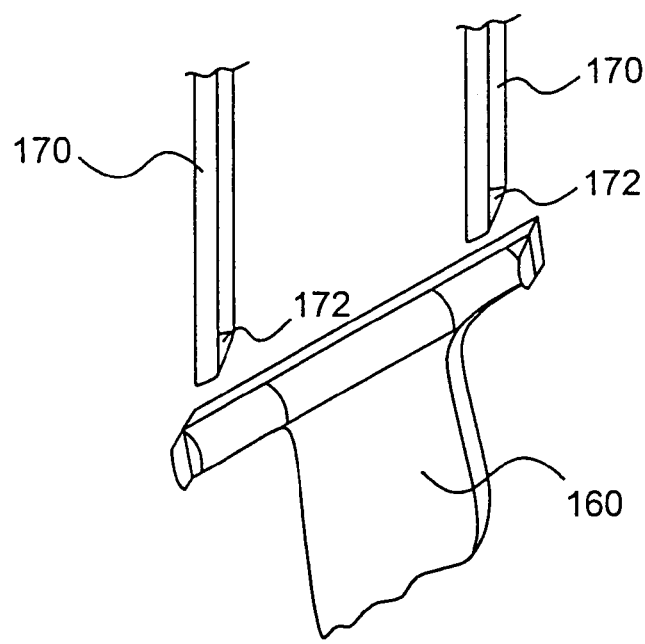
FIG. 4
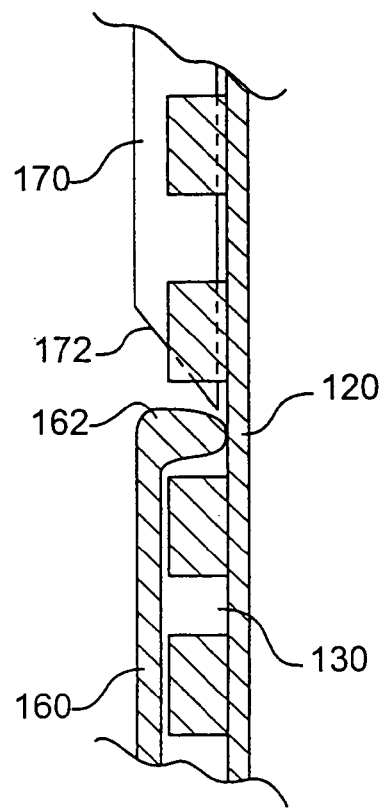 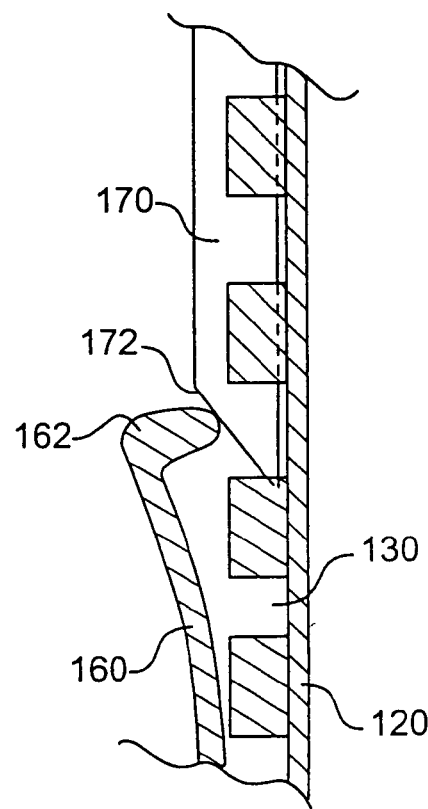
FIG. 5  FIG. 6

CHILD SEAT WITH OBJECT HOLDER

This is a divisional application of U.S. Ser. No. 10/072,601 filed Feb. 11, 2002, which is incorporated herein by reference in its entirety.

BACKGROUND

The present invention relates to child seats and, in particular, to child restraint seats. Child restraint seats, are provided in many sizes and configurations. Generally, conventional child restraint seats are "grown out of" in relatively short periods, and thus need to be replaced at various milestones in the physical development of the child. As the child grows, he or she graduates to a seat configured to accommodate the child's increased height and weight. Although the growth rate of children varies widely, even with the slowest growing children, replacement of the car seat becomes necessary before the end of the car seat life expectancy.

While the child is an infant, the parent must place the child in a rearwardly facing infant car seat for vehicular travel. The infant car seat needs to be designed to support an infant, who is not able to support him or her self, thereby allowing the infant, who cannot sit up on its own, to lie or recline in the seat. Once the child is able to sit upright, the infant seat must be replaced by a toddler-sized seat. In addition to providing a rearward-facing seating environment, the toddler-sized seat provides a forward-facing and slightly reclined seating environment for the toddler. The toddler seat is secured to the rear seat of the vehicle and typically includes a harness to secure the toddler within the seat. Eventually, however, the child outgrows the toddler-sized seat and progresses to a youth-sized seat. The youth-sized seat can accommodate children over 40 lbs. and functions primarily as a booster seat.

Child car seats must be replaced relatively frequently to accommodate the relatively fast growth rate of children—increasing height, weight, and needs of the child. Additionally, parents and other adults often must care for several children who do not fit within the same seat model. In this instance, the parents must buy two or more seats to accommodate their various-sized children.

Thus, there is a need to eliminate the waste and expense associated with the purchase of numerous child seats caused by the failure of most conventional seats to provide any adjustment for accommodating the change in the size of the occupant. As a child grows, the size of both the upper and lower body changes. Thus, there is a need for a car seat that allows the user to adjust the depth of the seat and the height of the backrest so that children of a variety of sizes may be accommodated.

Some existing child seats provides armrests for the child occupying the seat. However, most of these seats do not provide any adjustment in the position of the armrests to correspond to the size of the child. Furthermore, the adjustable armrests currently available do not provide for simple operation and cost effective design. Thus, there remains a need for a child seat that provides for cost effective and easy to operate adjustable armrests.

Many existing child seats provide extra amenities, such as storage pockets and beverage or container holders (i.e., cupholders). Existing cupholder designs are cumbersome, because some are not permanently attached to the child seat and/or do not provide for a retracted position when not in use. Thus, there remains a need for a child seat that provides an object holder attached to the seat that can move between a retracted storage position and an extended, in-use position.

Certain existing child seats are of two piece design. The back rest and the seat base are formed separately and are connected together, typically in a manner that permits adjustment of the angle of the backrest. This two piece design is advantageous because it allows for compact storage and shipping. Two piece designs also allow the child seats to be used either with or without the back.

Many existing car seats are problematic in that removal of the child seat from the vehicle causes the backrest and the seat base to separate unintentionally while handling the seat outside the vehicle. When moved away from the backrest of the conventional vehicle seat, the backrest of the child seat may fall to a position in a plane with the seat base and separate from the seat base. Thus, there remains a need for a two piece child seat having a configuration that reduces the likelihood of unintentional separation of the backrest and the seat base, yet still provides for simple and intuitive separation when desired.

Most child seats include a shoulder height belt guide to properly align the seat belt with the child's torso. Existing belt guides fall into two general categories, locking or free. Locking belt guides prevent any movement of the seat belt once the belt guide is locked. This configuration is preferred by many parents, because of the limited movement it provides for naturally restless children. On the other hand, some parents prefer a belt guide that operates in a free mode that allows the seat belt to withdraw and retract in response to movement of the child. Unfortunately, existing belt guides fail to provide the parent with the option between either a locking mode or free mode of operation. Thus, there remains a need for a child seat having a belt guide that provides the user with the choice of selecting operating modes between locking and free.

SUMMARY OF THE INVENTION

It is therefore an object of the present invention to provide a child seat that solves the aforementioned problems and drawbacks of known conventional child seats. This object is not limiting on the present invention, as many other advantageous and objects of the present invention are provided, as discussed further below. Furthermore, not all of the deficiencies of existing designs, discussed above, are overcome by each exemplary embodiment of the present invention discussed below.

According to the present invention a child seat comprising an adjustable backrest is provided. The backrest includes a top portion movably connected to a bottom portion wherein the position of the top portion is vertically adjustable; a latch connected to one of the top and bottom portions; and notches located in the other of the top and bottom portions. The latch is positioned to engage one of the notches to fix the position of top portion relative to the bottom portion.

The child seat may further include a release mechanism for disengaging the latch from the one of the notches. The release mechanism may include a member adapted to contact the latch and disengage the latch from the notch, and the latch may be configured to bend when contacted by the member. Preferably, the member includes a wedged surface positioned to contact the latch. The release mechanism may include a movable handle that is moved to disengage the latch from the notch. The latch is preferably biased toward engagement with one of the notches.

In another embodiment of the present invention, a child seat comprising a backrest having a top portion movably connected to a bottom portion wherein the position of the top portion is vertically adjustable; a tab connected to one of the top portion and the bottom portion; and notches located in the other of the top portion and the bottom portion is provided. The tab is positioned to engage one of the notches to fix the position of the top portion relative to the bottom portion.

The tab may be biased away from a position of engagement with one of the notches. The child seat may further include a movable rigid member positioned to contact the tab and control the engagement of the tab with one of the notches. The rigid member may be connected to the top portion of the backrest. Preferably, the rigid member is biased in an equilibrium position that corresponds to the tab being engaged with one of the notches and includes an enlarged section that contacts the tab when the rigid member is in the equilibrium position to force the tab to engage one of the notches. In addition, the rigid member may include a narrow section that contacts the tab when the rigid member is moved out of the equilibrium position, thereby allowing movement of the top portion relative to the bottom portion. The child seat may also include a handle connected to the rigid member and a spring for biasing the rigid member into the equilibrium position.

According to yet another embodiment of the present invention, a child seat having a seat portion and an object holder is provided. The seat portion includes a base having a seating surface, and the object holder is attached to the base and movable to a position at least partially under the seating surface.

The object holder may be pivotally or slidably attached to the base. Preferably, the object holder is configured so that when the object holder is moved under the seating surface a portion of the object holder remains accessible, thereby providing a gripping surface.

According to yet another embodiment of the present invention, a child seat is provided having a seat base including two connected portions. Each portion having a top surface, wherein the connected portions together form a seating surface, and wherein the connected portions are movably connected to each other, thereby allowing the area of the seating surface to be varied.

According to the present invention, one of the connected portions may be an interior connected portion that slides into the other connected portion. The interior connected portion may include a pushbutton that engages one of a plurality of holes located in the exterior connected portion. The pushbutton may be located on the seating surface or on the side of the seat base.

In another alternative embodiment, the connected portions may be pivotally connected. The first of the two connected portions may be adapted to rotate about 180 degrees from a first position, wherein most of the first connected portion may be contained within the other connected portion, to a second position, wherein most of the first connected portion may be located outside of the other connected portion to thereby enlarge the area of the seating surface.

According to another alternative, the connecting portions may be connected together with a linkage. The linkage may include a threaded rod and an arm, wherein one end of the arm is attached to one of the connected portions and another end of the arm is movably connected to the threaded rod so that when the rod rotates the arm moves to change the position of the connected portions relative to one another.

In another alternative, the child seat may further include a rod having a threaded portion, wherein one of the connected portions is attached to the threaded portion of the rod and the other connected portion is attached to another portion of the rod so that when the rod rotates the connected portion attached to the threaded portion moves to change the relative distance between the connected portions.

According to another embodiment of the present invention, a child seat having a base and an adjustable armrest is provided. The armrest may be connected to the base on a side of the seating surface; and may be adjustable between first and second positions. The armrest includes a connecting portion that slidably fits into or over a corresponding receiving portion of the base. The receiving portion may include a slot for receiving a tab located on the connecting portion. Preferably, the tab is attached to a flexible portion of the connecting portion of the armrest thereby allowing the tab to disengage with the slot when the tab is depressed.

According to yet another preferred embodiment a child seat including base pivotally connected to a backrest is provided. The base and the backrest are pivotally connected by a connection mechanism that includes a plurality of hooks engaged with a bar. The curved surface of at least one of the hooks opposes the curved surface of at least two of the other hooks. The bar may include a plurality of flat sections, wherein each flat section is positioned to engage with one of the hook sections. Preferably, the flat sections are arranged so that when the child seat is in a normal, installed position, each flat section of the bar faces the curved surface of one of the hooks.

In yet another embodiment of the present invention a child seat comprising a back rest and having a guide for a seat belt is provided. The guide includes a locked position for locking the seat belt in position relative to the belt guide and a free position wherein the seat belt can move relative to the guide. It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 4 is a perspective view of the backrest locking mechanism according to the embodiment of the present invention shown in FIG. 3.

FIG. 5 is a cross-sectional view of the backrest locking mechanism taken in the direction of the lines A-A of FIG. 3 showing the backrest in the locked position.

FIG. 6 a cross-sectional view of the backrest locking mechanism taken in the direction of the lines A-A of FIG. 3 showing the backrest in the unlocked position.

DETAILED DESCRIPTION

Throughout the following description any reference to directions such as, for example, up, down, horizontal and vertical is meant to refer to the directions associated with a child seat when in use in a vehicle.

Figure 1:
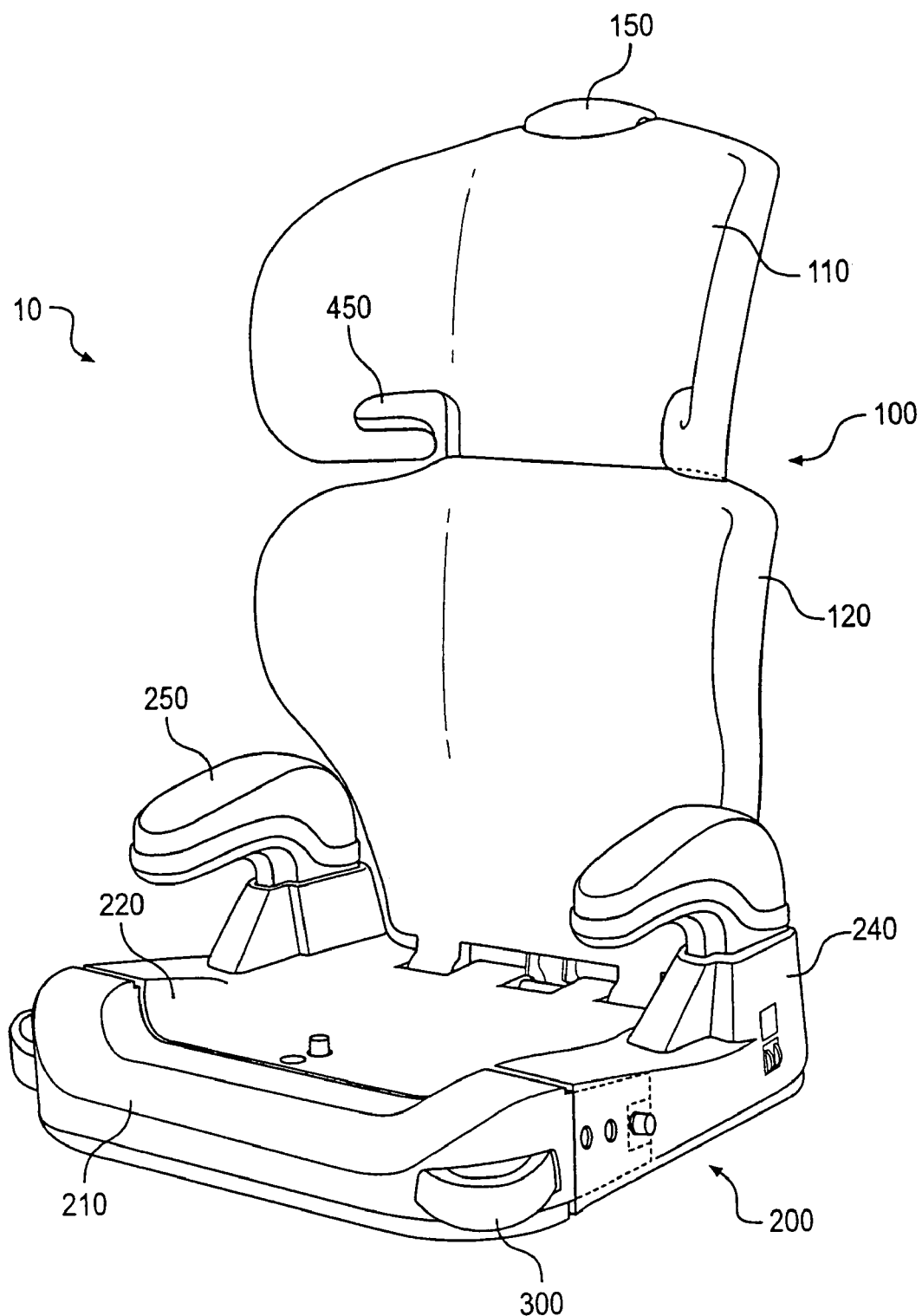
FIG. 1 is a perspective view of an child seat in accordance with the present invention.

As shown in FIG. 1, the present invention is directed to a child vehicle seat. The car seat 10 includes a backrest 100 connected to a seat base 200. The backrest 100 includes a top portion 110 serving as a headrest. The backrest 100 further includes a lower or bottom portion 120. The bottom portion serves as a back support 120 and is connected to the base 200.

The seat base 200 may be used either with or without the backrest 100. When the base 200 is to be solely used without the backrest 100 as a backless booster seat, a mechanism for connecting with the backrest 100 may be omitted. In such a case, the seat base will include a smooth seating surface.

The base 200 preferably includes front and rear portions connected together. Preferably, the front portion 210 is connected to the rear portion 220 so that a generally smooth seating surface is created. In a particularly preferred embodiment, the position of the front portion 210 relative to the rear portion 220 may be adjusted in order to vary the depth of the seat size of the seating surface.

The base 200 also includes a pair of armrests 250 which may be of fixed or variable height. As shown in FIG. 1, the base 200 includes two upwardly extending sections 240 for receiving the armrests 250. As described further below, the height of each armrest 250 relative to the seating surface of the base 200 may be adjusted to conform to the occupant of the seat 10. The armrests 250 function to properly locate the lapbelt across the lower pelvic region of the occupant.

Figure 2:
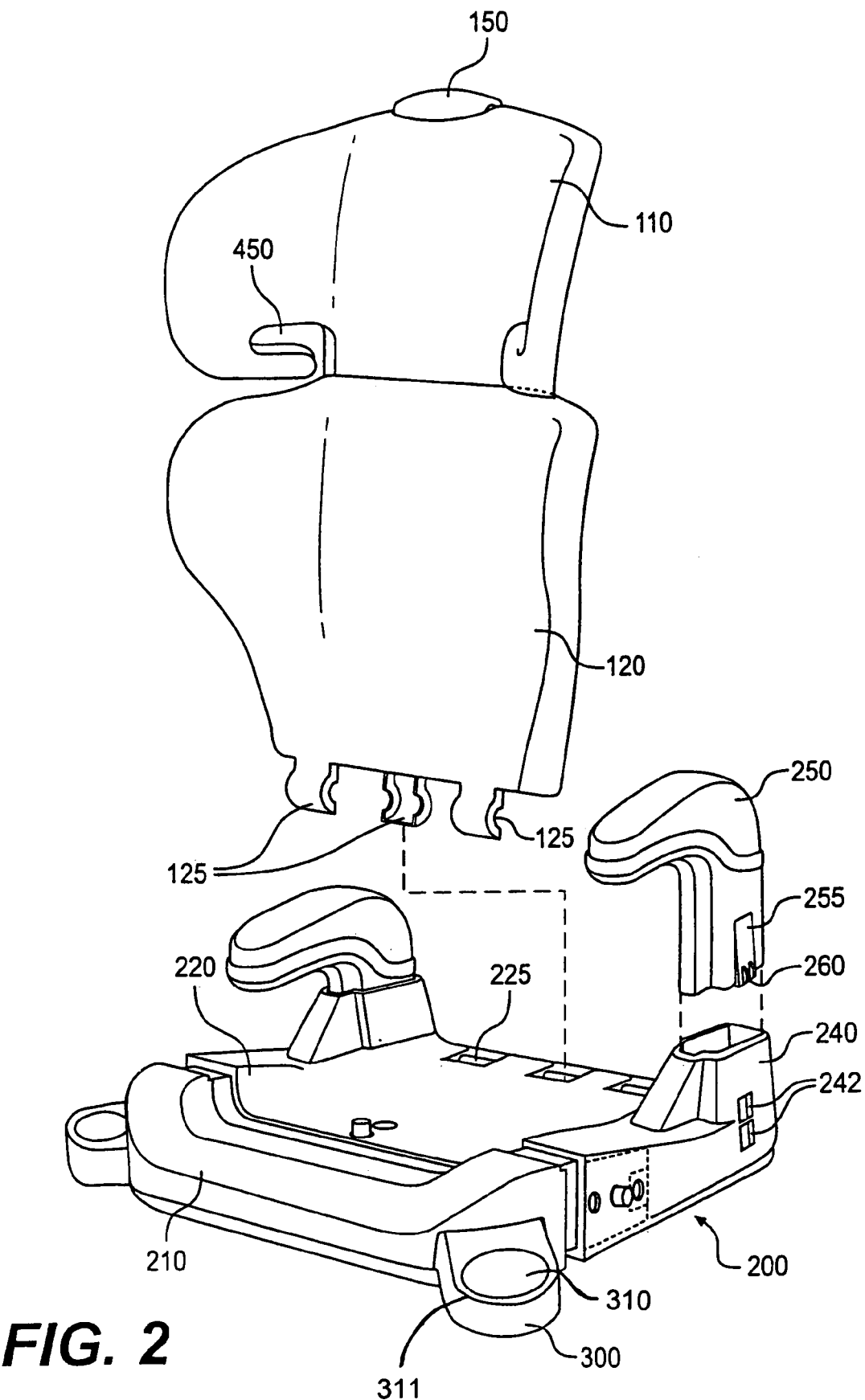
FIG. 2 is an exploded perspective view of the child seat of FIG. 1.

The child seat 10 may also include an object holder 300, which, as shown in FIG. 2, has a cavity 310 for receiving and holding an object (not shown) and a sidewall 311 to define the cavity 310. As shown in FIG. 1, the object holder 300 may be attached to the base 200. In particular, the container holder 300 may be mounted under the seating surface of the base 200 for movement between a retracted, storage position and an extended, in-use position. FIG. 1 shows the container holder 300 in the retracted position.

The exemplary embodiment of the present invention shown in FIG. 1 further includes a conventional belt guide 450. As shown in the drawings, the conventional belt guide 450 only provides for use of a vehicle shoulder belt (not shown) in a "free" mode. The belt guide 450 does not include provision for locking the seat belt in position. As discussed further below, with reference to FIG. 12, the present invention includes a belt guide having both "free" and "locking" modes of operation.

As shown in FIG. 2, in a preferred embodiment of the present invention, the backrest 100 is pivotally attached to the base 200. The bottom portion of the backrest 120 includes at least three hooks 125. The hooks 125 engage a bar 225 located near the back edge of the rear portion 220 of the base 200. As described further below, the bar 225 includes flat sections 226 that are positioned to permit the hooks 125 to disengage from the bar 225 when separation of the backrest 100 from the base 200 is desired. Separation of the seat parts may be required or desired for storage or shipping of the child seat, for example.

FIG. 2 discloses the base 200 with an enlarged or extended seating surface. The front portion 210 of the base 200 is extended further away from the rear portion 220 of the base. FIG. 2 also discloses an extended position of the container holder 300. For exemplary purposes only, FIGS. 1 and 2 show two alternative positions for certain features of the child seat 10. However, included within the scope of the present invention are many additional adjustment positions of the various seat components (e.g. container holder 300, seat base 200, backrest 100, armrest 250, etc.) including positions intermediate to and beyond the exemplary embodiment shown in the drawings.

Preferably, the parts associated with the child seat 10 are conventional plastic formed in an injection molding process.

As shown in FIG. 2, the height of the armrests 250 is adjustable. In a preferred embodiment, each armrest 250 includes a flexible tab 255. Preferably, the flexible tab 255 in integrally formed with the rest of the armrest 250 during an injection molding process. The tab 255 may include protrusions 260. The protrusions 260 are positioned to engage one of at least two holes 242 located in an armrest receiving portion 240 of the base 200. The holes 242 may be divided into two adjacent holes to conform to the exemplary shape of the protrusions 260 shown in FIG. 2.

For convenience, FIG. 2 shows one of the two armrest 250 in an exploded view. However, according to the present invention, both of the armrests 250 are adjustable. When one of the armrests 250 is secured in a selected position, the protrusions 260 are located in one of the holes 242. When a change in the height of the armrest is desired, the protrusions 260 are pushed inwardly, and the tab 255 pivots inward relative to the armrest 250 allowing the protrusion 260 to disengage from the hole 242. The armrest 250 then may slide upward or downward, as appropriate, until the protrusions 260 engage the desired holes 242.

While the preferred embodiment shown in FIG. 2 is directed to protrusions located on a pivoting and flexible tab, the present invention includes other acceptable alternatives, such as a push button or latch mechanism. Furthermore, although the drawings show the armrest 250 to be inserted into the base 200, the present invention includes an alternative arrangement in which the armrest 250 slides over the upwardly extending portion 240 of the base 200. In such an arrangement, the flexible tab 255 and protrusions 260 would be positioned on the upwardly extending portion 240 of the base 200, and the holes 242 would be located on the arm rest 250.

With reference to FIGS. 3 through 8, the backrest height adjustment mechanism will now be described. As mentioned above, the backrest 100 includes a top portion 110 and a bottom portion 120. The top portion 110 functions primarily as a head and neck rest for the seat occupant. The bottom portion 120 provides upper and lower back support. The height of the backrest 100 may be adjusted by sliding the top portion 110 upward or downward relative to the bottom portion 120. The height adjustment allows for proper positioning of the shoulder belt relative to the occupant. In addition, the height adjustment ensures that the top of the backrest 100 supports the occupant's head.

Figure 3:
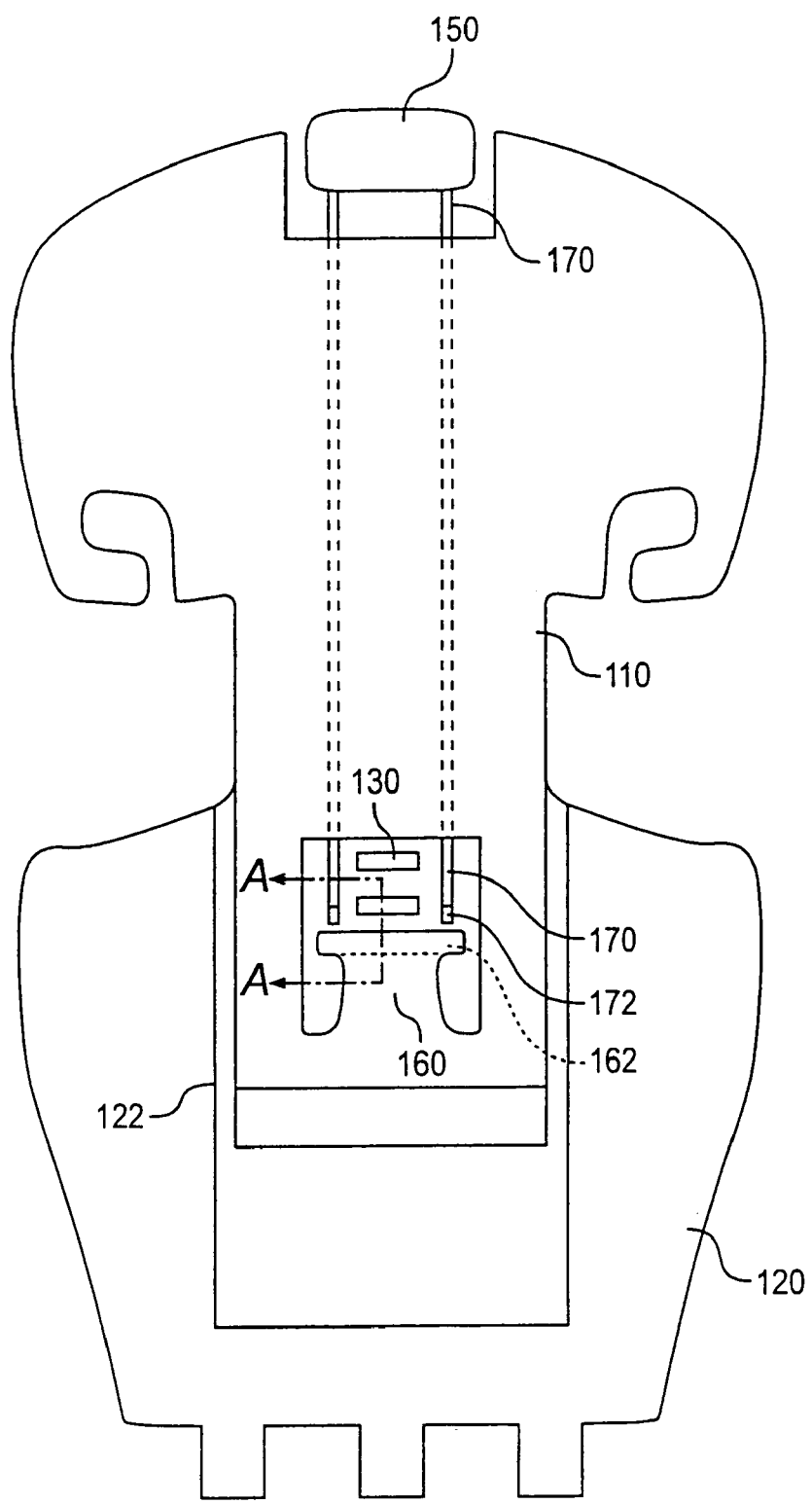
FIG. 3 is a back view of the backrest of the seat according to one embodiment of the present invention.

As shown in FIG. 3, the top portion 110 may be slidably attached to the bottom portion 120. The bottom portion 120 may include a guide section 122 for maintaining the vertical alignment of the top portion 110. The position of the top portion 110 relative to the bottom portion 120 may be locked or fixed using a locking mechanism. The locking mechanism may include a latch 160 positioned to engage a series of notches 130.

As shown in FIG. 3, the latch 160 is preferably connected to the top portion 110. The notches 130 are preferably located on the bottom portion 120. The latch 160 is pivotally connected to the top portion 110. The pivotal connection between the latch 160 and the top portion 110 is preferably made by integrally forming the latch 160 with the top portion 110 during an injection molding process. Alternatively, the latch 160 may be pivotally connected to the top portion 110 through other acceptable arrangements such as, for example, a hinge and pin connection.

The latch 160 is biased toward engagement with the notches 130. As a result, secure connection between the top portion 1-10 and bottom portion 120 of the backrest 100 is maintained. As shown in FIG. 4, the latch 160 includes at least one protrusion 162 for engaging a notch 130. As shown in FIGS. 3 and 5, when the backrest 100 is locked (i.e., no relative movement between the top portion 110 and the bottom portion 120), the protrusion 162 of the latch 160 fits securely in one of the notches 130.

The child seat 10 may further include a release mechanism for unlocking the backrest 100. The release mechanism includes a handle 150 located at the top of the backrest 100. The handle 150 is connected to a pair of rigid members 170 positioned to interact with the latch 160. In the preferred embodiment shown in the drawings, two rigid members 170 are provided. However only one rigid member is required. As an alternative, a flexible member may be stretched to disengage the latch. The tensile force on the member during disengagement would bias the handle toward its normal position.

Preferably, each rigid member 170 is a sliding rail connected to the top portion 110 of the backrest 100. Each rail 170 includes a wedge 172 located at its lower end, adjacent to the latch 160. The wedge 172 is positioned so that when the handle 150 is depressed, the wedge 172 moves downwardly to contact and lift the latch 160 and disengage the protrusion 162 from the notch 130, as shown in FIG. 6.

With the handle maintained in a depressed condition to disengage the latch 160 from the notch 130, the position of the upper portion 110 of the backrest 100 may be changed upwardly or downwardly. When the new desired position is reached, the handle 150 may be released causing the biasing force on the latch 160 to force the bars 170 upwards. The protrusion 162 on the latch 160 then can engage the adjacent notch 130 located in the backrest 100 to lock the backrest in position. Following release of the handle 150, a minor adjustment in the height of the top portion 110 relative to the bottom portion 120 may be required in order to align the latch 160 with the closest notch 130. In an alternative embodiment, the handle 150 may be biased upwardly by a spring or other mechanism.

The child seat may be arranged so that lifting of the handle 150 provides for disengagement or unlocking of the top and bottom portions of the backrest 100.

Figure 7:
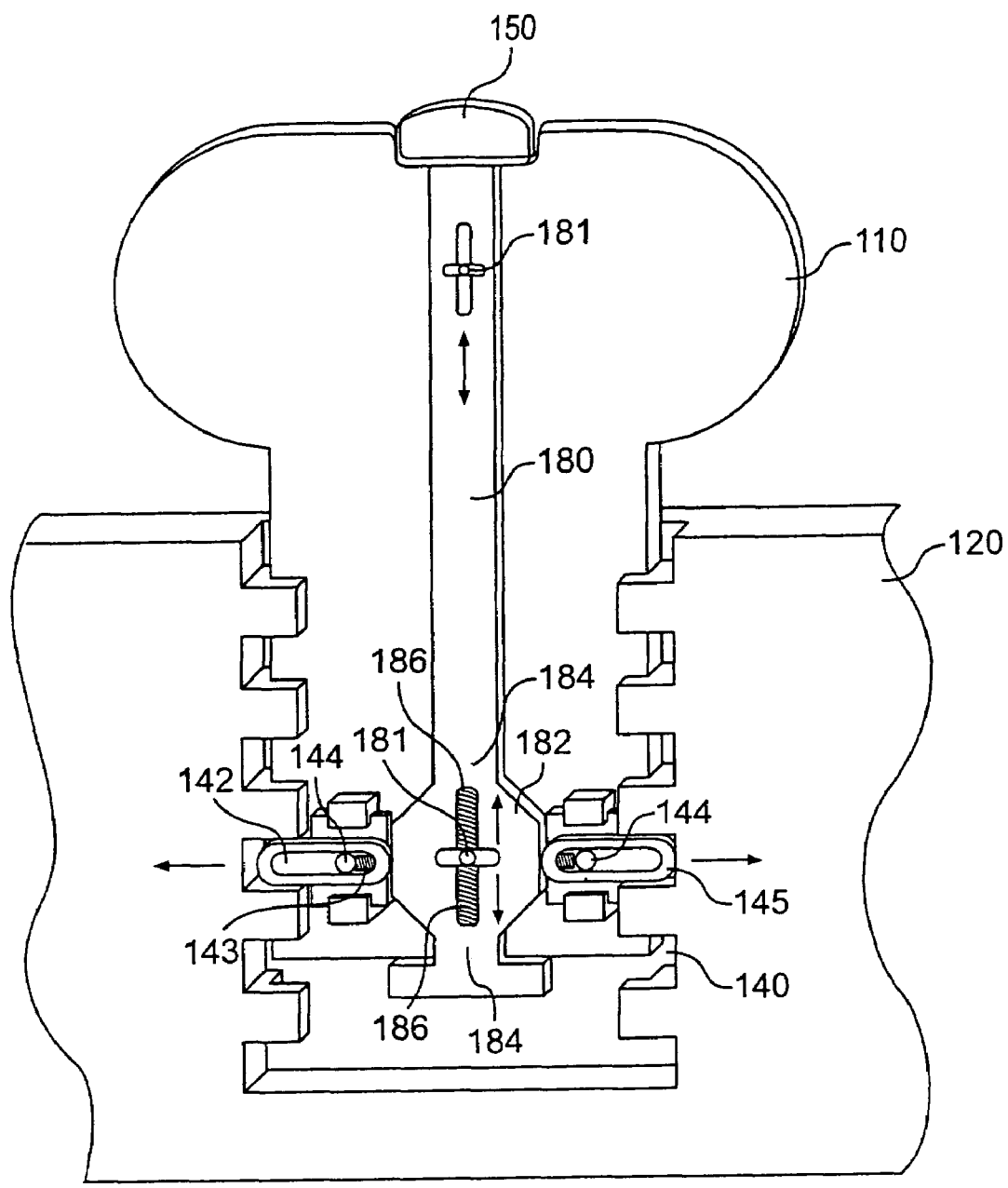
FIG. 7 is a back view of the backrest of the seat according to another embodiment of the present invention showing the backrest in the locked position.
Figure 8:
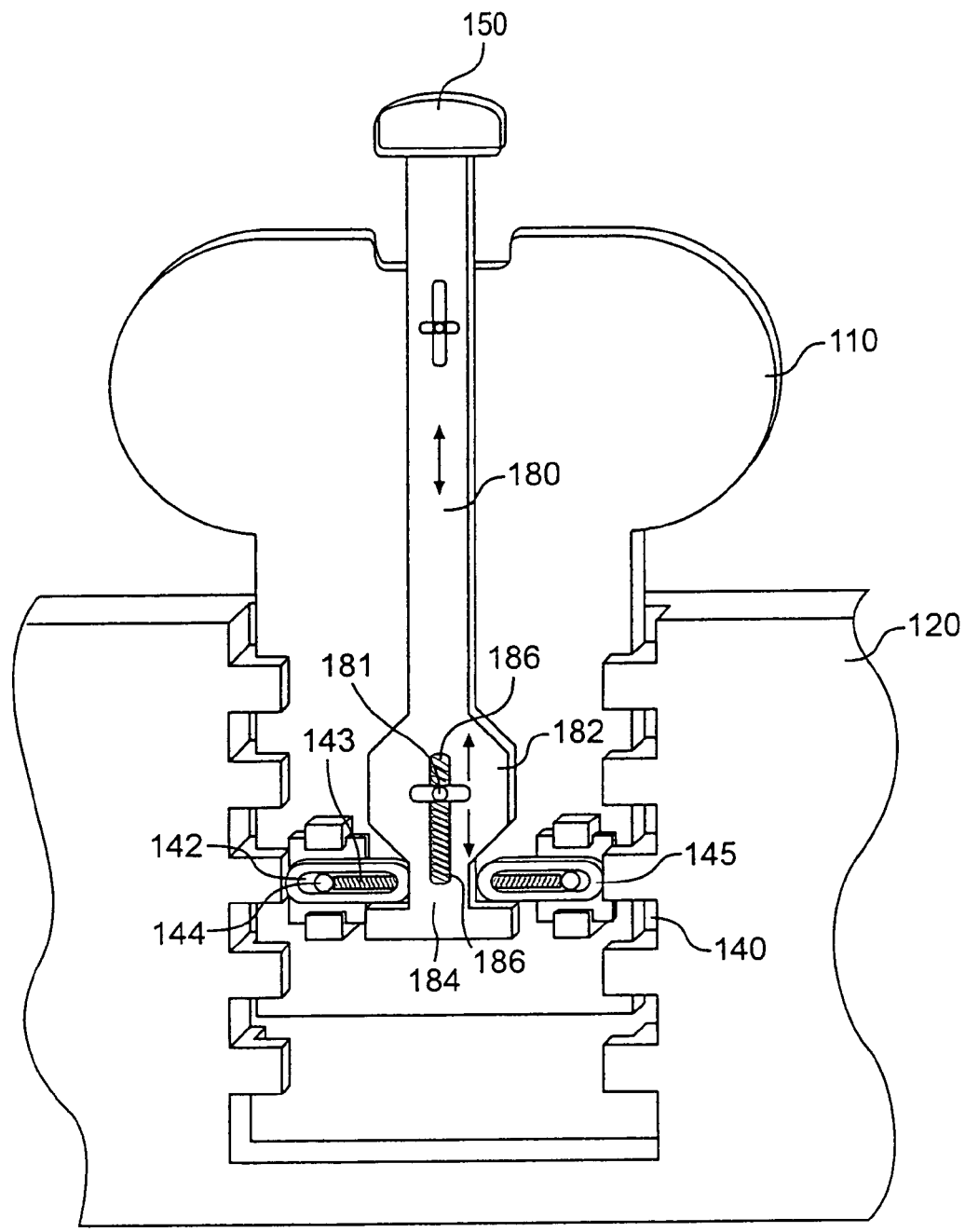
FIG. 8 is a back view of the backrest of the seat according to the embodiment of the present invention shown in FIG. 7 showing the backrest in the unlocked position.

An alternative embodiment of the height adjustment mechanism for the backrest 100 is disclosed in FIGS. 7 and 8. As shown in FIG. 7, the bottom portion 120' of the backrest 100' may include a series of notches 140 positioned to receive a tab 145 connected to the upper portion 110' of the backrest 100'. As shown in FIG. 7, a pair of tabs 145 are preferably provided. Similarly, the bottom portion 120' preferably includes two vertical rows of notches 140, each row positioned to interact with one of the tabs 145. The tabs 145 are biased inwardly away from the notches 140. In the exemplary embodiment shown the biasing is provided by a compression spring 143. The spring 143 is positioned in a slot 142 located in the tab 145. The tab 145 is slidably connected to the top portion 110' of the backrest 100 to slide in and out of notches 140. A post 144 is provided in the slot 142 of the tab 145. The spring 143 contacts the post 144, and at the other end the spring 143 contacts the tab 145 at one end of the slot 142.

As shown in FIG. 7, when the tab 145 is fully engaged with the notch 140, the spring 143 is compressed due to the position of the post 144 in the slot 142. As shown in FIG. 8, when the tab 145 is disengaged from the notch 140, the position of the post 144 in the slot 142 allows the compressive force on the spring 143 to be released.

The position of the tabs 145 relative to the notches 140 is controlled by a release mechanism which includes a handle 150' connected to an elongated, vertical rigid member 180. The rigid control member 180 is slidably connected to the top portion 110' of the backrest 100'. Preferably, the control member 180 is biased to an equilibrium position shown in FIG. 7 by a pair of springs 186. The equilibrium position of the rigid member 180 corresponds to a locked or latched position of the backrest 100'. In the equilibrium position, an enlarged portion 182 of the control member 180 contacts the tabs 145, thereby overcoming the force of the springs 143 and forcing each of the tabs 145 into engagement with one of the notches 140 to lock the backrest 100'.

When a change in position of the top portion 110' of the backrest 100' is desired, the handle 150 is moved upwardly or downwardly to move the rigid member 180 out of its equilibrium position. When the rigid member is moved out of its equilibrium position, the enlarged portion 182 of the rigid member no longer forces the tabs 145 outwardly to engage the notch. Instead, a narrow portion 184 of the rigid member 180 (located either above or below the enlarged portion 182) engages the tabs 145, allowing each tab to retract out of the notch 140 due to the biasing of the spring 143.

When the tabs 145 are in the retracted position, the top portion 110' of the backrest 100 may be adjusted upwardly or downwardly as desired. When a new desired position is reached, the handle 150 is released, and the control member 180 returns to its equilibrium position due to the biasing of the springs 186. In the equilibrium position, the enlarged portion 182 of the control member 180 forces the tabs 145 to move outwardly and engage the corresponding notches 140. After release of the handle 150, the position of the top portion 110' may require a further minor adjustment in order to align the tabs 145 with the closest corresponding notches 140. The notches 130 and the latch 160 may be configured (e.g., rounded) as necessary to improve engagement.

Figure 9:
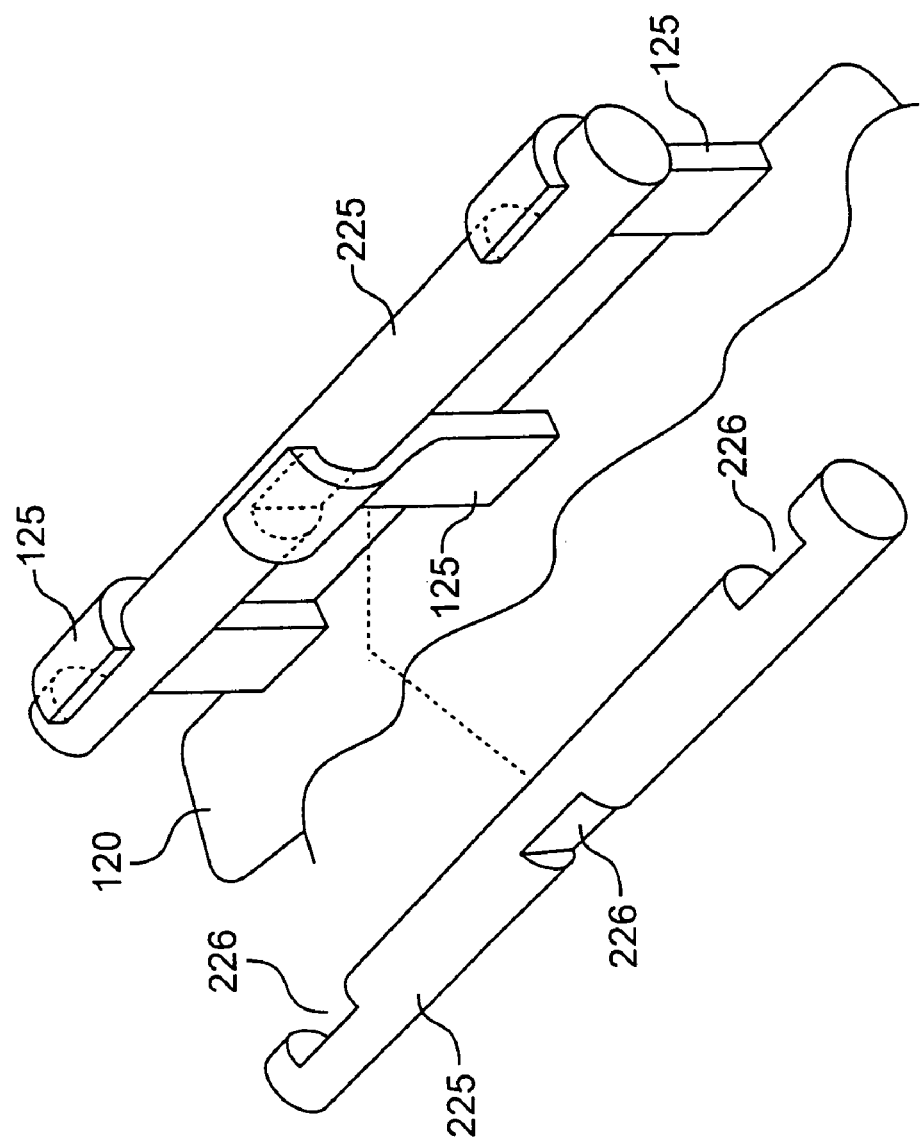
FIG. 9 is an exploded perspective view of the backrest and seat base connection.

The connection between the backrest 110 and the base 200 of the child seat 10 will now be discussed with reference to FIGS. 1, 2 and 9. As shown in FIG. 2, the backrest 100 includes at least three hooks 125 protruding downwardly from the bottom portion 120 of the backrest 100. The hooks 125 engage with a bar 225 located in the base 200. As shown in FIG. 2, the hooks 125 are arranged so that at least two hooks face in one direction and at least one hook faces in the other direction. The bar 225 includes three semi-circular sections corresponding to the locations of the hooks 125. The semi-circular sections include flat sections 226 facing in opposite directions to the curved portions of the hooks 125 when the backrest 100 is installed in the base 200, as shown in FIG. 1. For example, the flat section of the central semi-circular section in FIG. 2 faces the front of the child seat, and the flat sections of the leftmost and rightmost semicircular sections of FIG. 2 face the rear of the child car seat. This arrangement of the hooks 125 and bar 225 prevents inadvertent separation of the backrest 100 from the base 200. Preferably, the bar 225 is integrally formed with the seat base 200 through an injection molding process.

In order to separate the backrest 100 from the base 200, the curved portions of the hooks must be aligned with the flat sections 226 of the bar 225. When the child seat 10 is in its normal position and the backrest 100 is positioned as shown in FIG. 1, the hooks 125 are in contact with the curved perimeter of the bar 225. As a result, separation of the backrest 100 from the base 200 is prevented. If the backrest 100 is pivoted past a point of normal operation, for example greater than 45 degrees from the vertical position shown in FIG. 1, separation of the backrest 100 from the base 200 is still prevented due to the opposite facing of adjacent hooks 125. For example, when the backrest 100 is pivoted to a position in substantially the same plane as the base 200, separation of the backrest 100 and the base 200 would not occur because each hook engages at least one quadrant of the curved perimeter of the bar 225. The bar 225 or hooks 125 may further include nubs or protrusions to alert the user when the backrest 100 is being reclined past the maximum angle of suggested operation.

In a conventional child seat, oppositely facing hooks are not included, thereby allowing the backrest to lift off the base whenever the hooks are not fully enclosed by the structure of the seat base in the manner shown in FIG. 1. In order to fully separate the backrest 100 from the base 200, the backrest 100 must be further rotated to a position approximately 180 degrees relative to the normal use position shown in FIG. 1. In such a position, shown in FIG. 9, each hook 125 engages one of the flat sections 226 of the bar 225, thereby eliminating any engagement between the hooks 125 and the bar 225 and allowing a simple separation of the backrest 100 from the seat base 200.

The exemplary embodiment of the present invention shown in the drawings includes three hooks. However, three hooks is only the minimum number of hooks required by the present invention. The scope of the present invention includes a connection having four or more hooks, as long as at least one of the hooks is oriented in a generally opposite direction as one of the remaining hooks to prevent an undesired separation of the backrest from the seat back.

Furthermore, the scope of the present invention also includes a backrest and seat base arrangement in which the hooks 125 are attached to the seat base 200 and the bar 225 is attached to the backrest 100.

Figure 10:
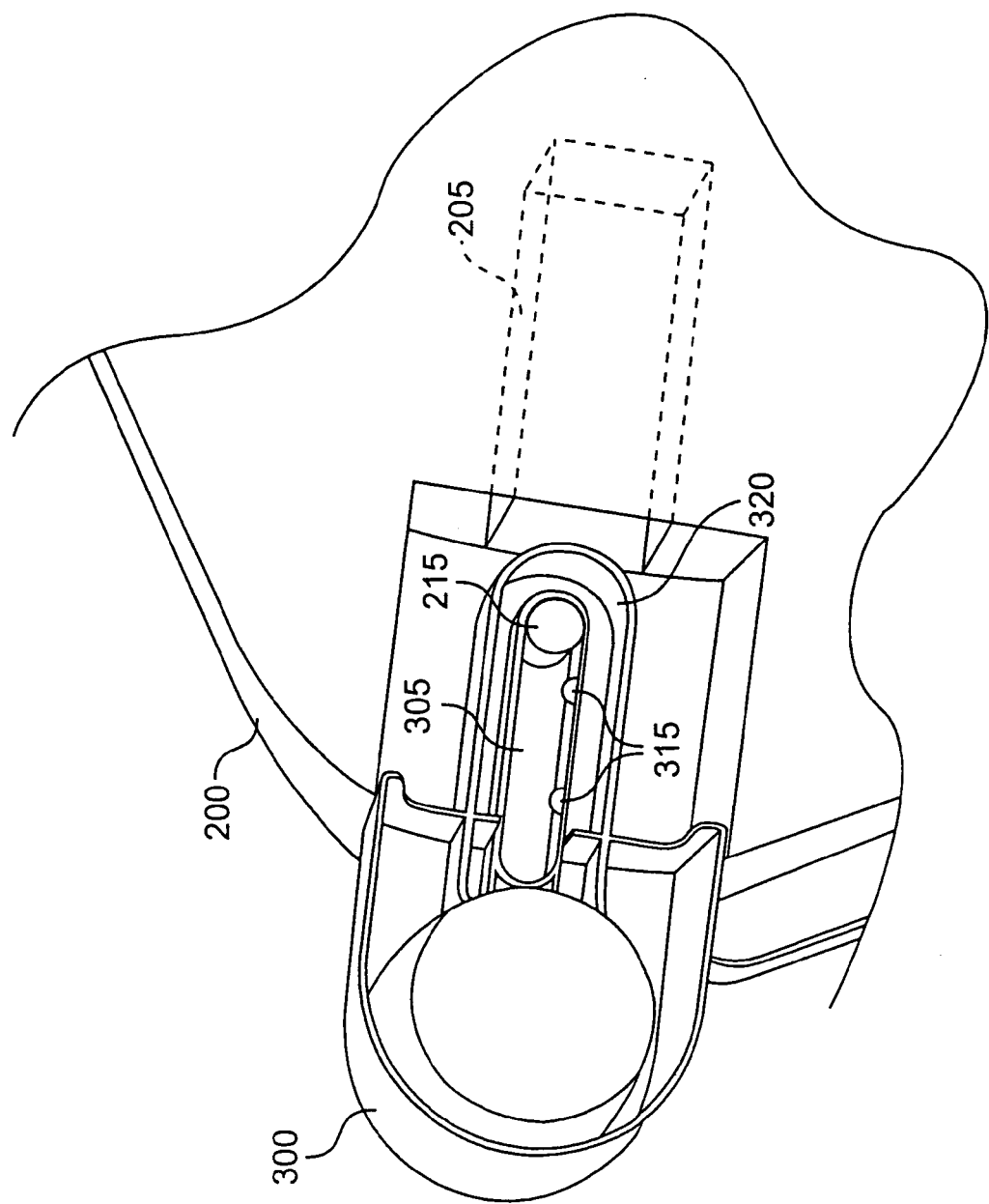
FIG. 10 is a bottom perspective view of the container holder attachment to the base according to the embodiment of the present invention shown in FIG. 1.

The arrangement of the object holder 300 according to the present invention will now be described. FIG. 10 discloses the object holder in an extended position. The object holder 300 includes an extension 320 that may be attached to the seat base 200. The extension 320 includes a slot 305 for receiving a post 215 secured to the base 200 of the child seat. When not in use, the object holder 300 may be pushed inwardly under the seating surface allowing slot 305 to slide along the post 215 to a retracted position. The extension 320 slides into a recess 205 located in the seat base.

The slot 305 may include inwardly protruding bumps 315. The bumps 315 serve to prevent the container holder 300 from changing position without the intentional application of sufficient force to move the extension 320 and bumps 315 past the fixed post 215. Alternative arrangements may be provided such as, for example, the provision of bumps on the post 215 along with corresponding detents in the side surfaces of the slot 305.

Figure 11:
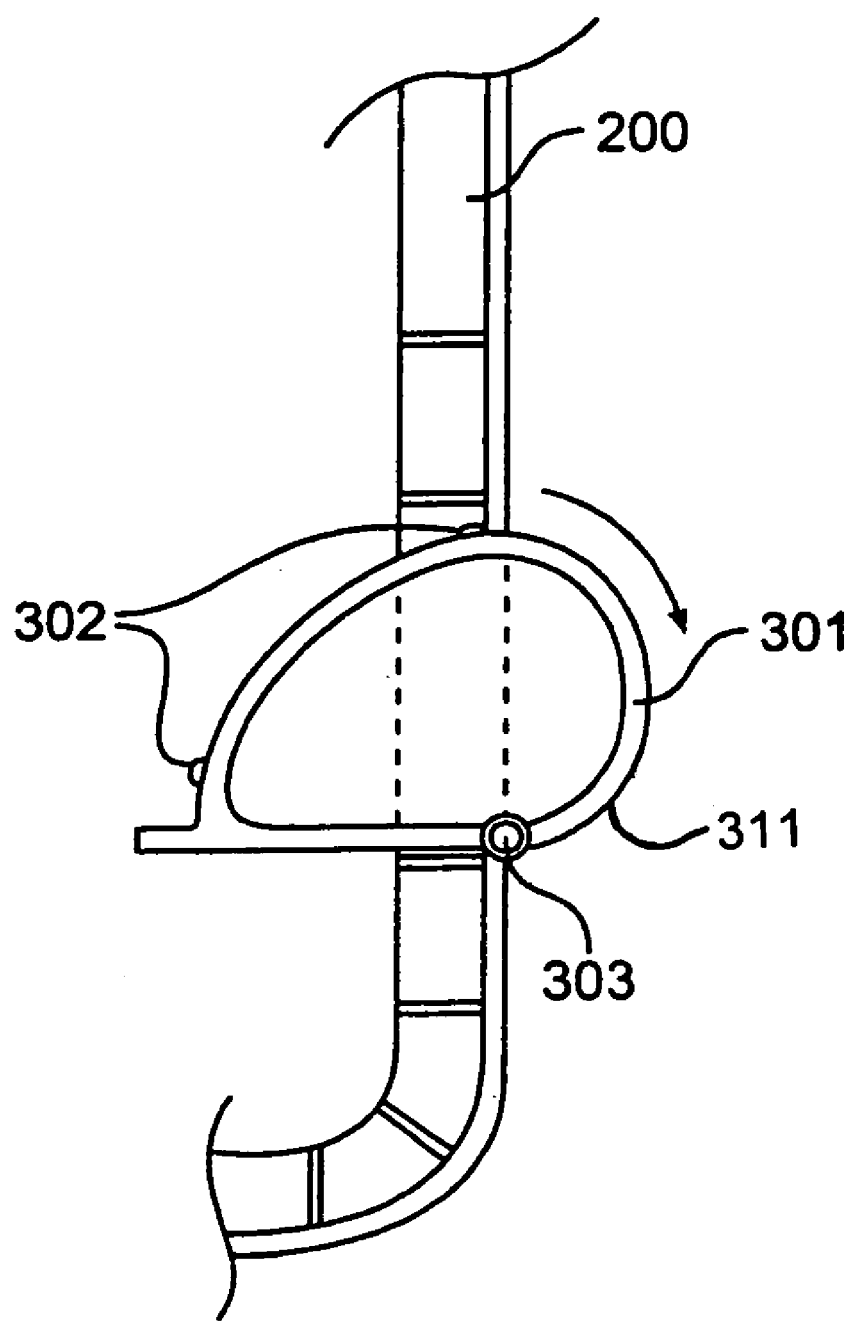
FIG. 11 is a top plan view taken in partial cross-section through the seat base of a pivoting container holder according to an alternative embodiment of the present invention.

FIG. 11 discloses an alternative embodiment of an object holder 301 according to the present invention. The object holder 301 is pivotally attached to the base section 200 at a pivot point 303. The object holder 301 can be pivoted in the direction of the arrow in FIG. 11 to move the container holder 301 from the retracted position to the extended position. As in the previous embodiment, the container holder 301 may include bumps 302 to maintain the container holder 301 in the desired position.

A portion of the sidewall 311 (see FIGS. 2 and 11) of the object holders 300, 301 may be accessed when the object holder 300, 301 is retracted in order to provide a handgrip for use in changing position of the holder.

Figure 12:
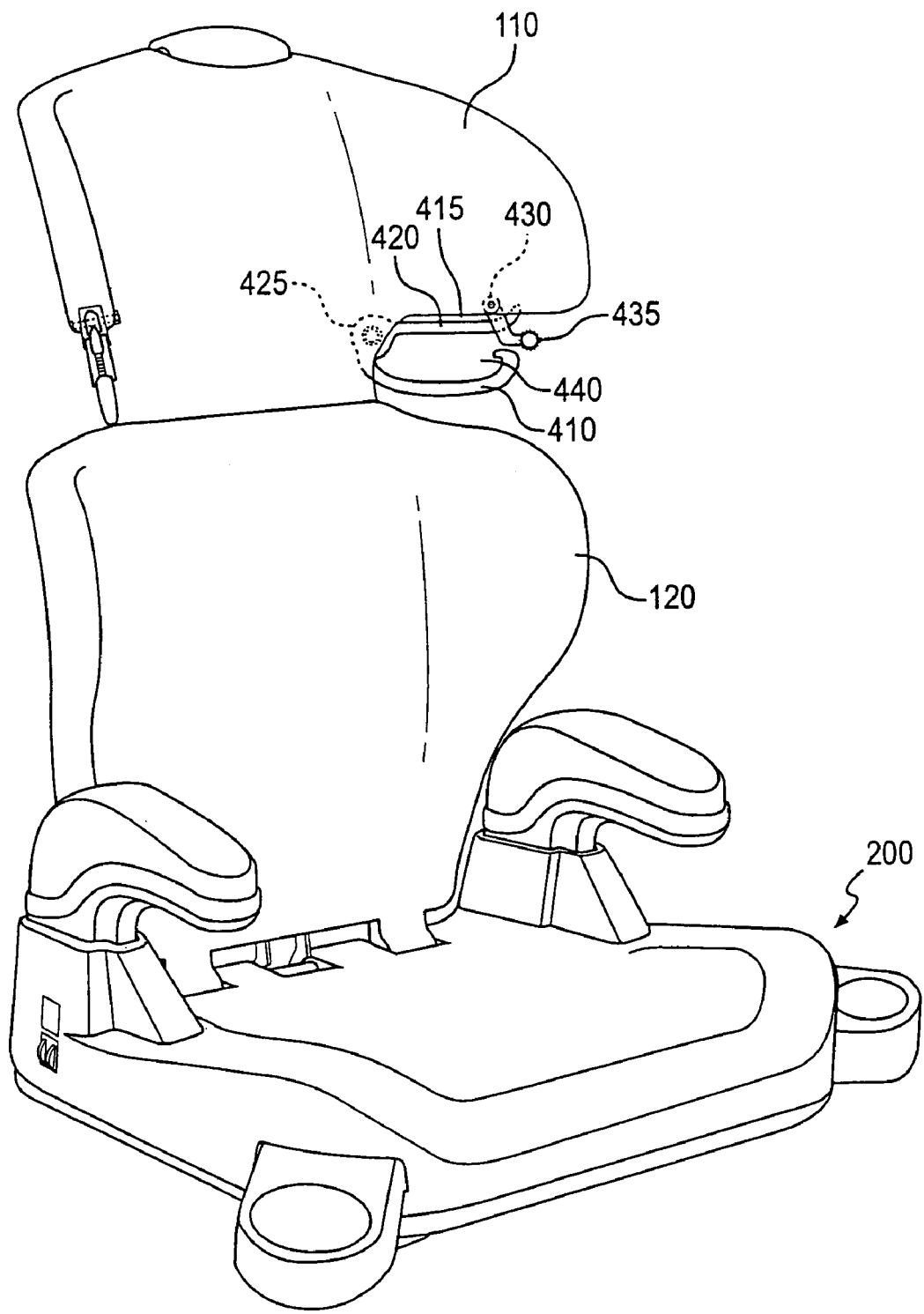
FIG. 12 is a perspective view of an alternative embodiment of a child seat having a belt guide according to the present invention.

As shown in FIG. 12, the child seat 10 may include a belt guide 400. The belt guide 400 provides a path for a vehicle seat belt over the shoulder of the occupant of the child seat. According to the desires of the user or supervising adult, the belt guide 400 may be used in either a locking or free mode.

The belt guide 400 includes two substantially parallel bars. The upper bar 420 is located just below the side head protectors of the top portion 110 of the backrest 100 and is pivotally secured to the backrest 100. The lower bar 410 extends from the point 425 where the guide 400 is secured to the backrest 100 and is positioned below the upper bar 420 to create a gap 440 between the upper and lower bars. The belt guide 400 further includes a locking tab 435 for adjusting the position of the upper bar 420. The locking tab 435 is pivotally connected to the top portion 110 of the backrest at pivot point 430, and includes a slot to receive the bar 420. The locking tab 435 is arranged with a knob or lever to facilitate operation by the user.

When the belt guide 400 is used in the locking mode, the seat belt passes through the small gap 415 between the top portion 110 of the backrest and the upper bar 420 of the belt guide. In order to position the seat belt above the upper bar 420 in gap 415, the locking tab 435 is rotated counterclockwise upward about the pivot point 430 to separate from the upper bar 420, thereby creating a passage through which the seat belt can be placed above the upper bar 420. After the seat belt is positioned above the upper bar 420, the locking tab 435 is pivoted downward in a clockwise direction, engaging the upper bar 420 through camming action and forcing the upper bar 420 upwards against the top portion 110 of the backrest.

The seat belt is clamped between the upper bar 420 and the backrest 100. The frictional force applied by the bar 420 and the backrest 100 secures the belt in position. Preferably, the seatbelt becomes convoluted during clamping, thereby enhancing the clamping action of the belt guide 400.

When the belt guide 400 is desired to be used in the free mode, the seat belt is placed in the gap 440 between the upper bar 420 and the lower bar 410. The upper bar 420 and the lower bar 410 do not clamp the seat belt, thereby allowing the seat belt to slide back and forth through the gap 440.

When used in the free mode, the belt guide 400 allows the occupant of the child seat to move relative to the backrest 100. On the other hand, when used in the locking mode, the belt guide 400 limits the movement of the occupant of the child seat. Use of the belt guide 400 in the locking mode may be desired to restrict movement of an overly energetic child.

As mentioned above, the child seat 10 may be configured to permit the user to adjust the depth of the seat base 200. The seat depth adjustment will now be described with reference to FIGS. 13 through 17.

Figure 13:
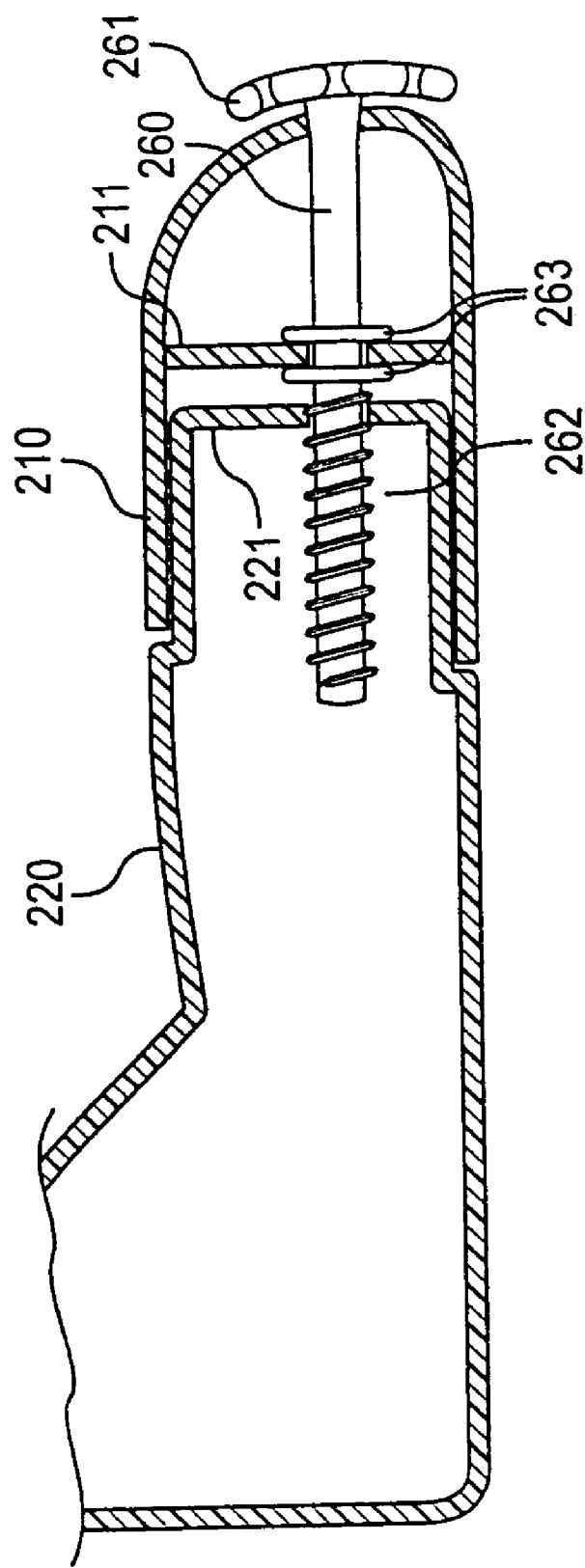
FIG. 13 is a cross-sectional side view of an adjustable seat base according to one embodiment of the present invention.

In a first embodiment, shown in FIG. 13, the front portion 210 of the seat base slides over the rear portion 220. A rod 260 passes through both the front portion 210 and the rear portion 220. The rod includes a pair of disks or pins 263 positioned to sandwich an interior vertical wall 211 located in the front portion 210 of the seat base 200. The arrangement of the disk 263 and the wall 211 ensures that the position of the rod 260 relative to the front portion 210 of the seat base does not change. The rod 260 includes a threaded portion 262 which engages a substantially vertical wall 221 of the rear portion 220 of the seat base. The rod further includes a handle 261.

Rotation of the handle 261 causes a corresponding rotation of the threaded portion 262 of the rod 260 thereby moving the rear portion 220 and the front portion 210 of the base closer to or further away from each other. Thus, through rotation of the handle 261, the user of the child seat may vary the depth of the seat base 200 as necessary to accommodate different sized occupants.

FIG. 13 is an exemplary embodiment. Thus, in an alternative embodiment the seat base can be reconfigured so that the rear portion '220 of the seat base con slide over the front portion 210.

Figure 14:
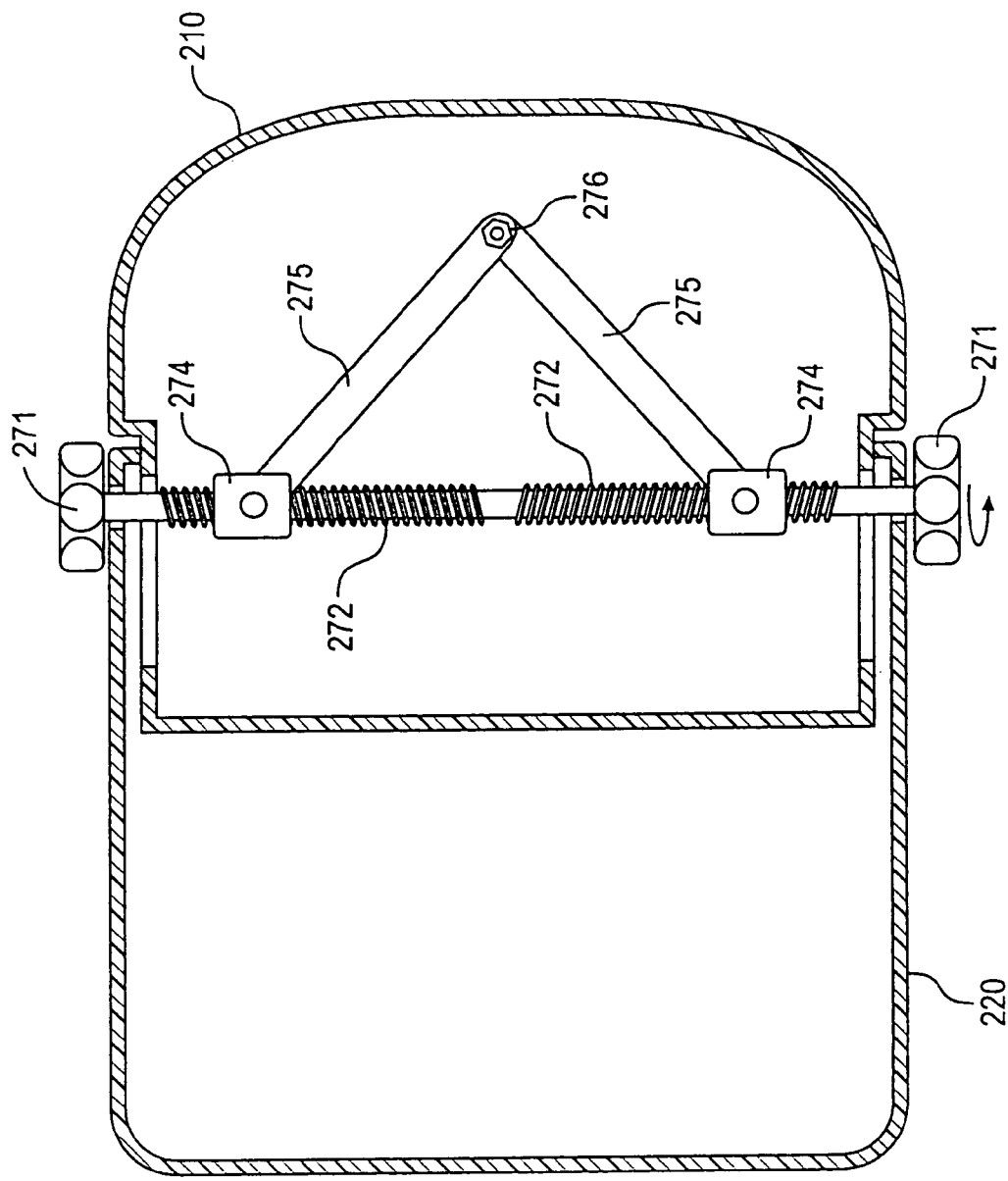
FIG. 14 is a bottom view of an adjustable seat base according to another embodiment of the present invention.

FIG. 14 discloses an alternative embodiment of the seat base 200. As shown in FIG. 14 a rod 270 is provided. The rod 270 passes through the seat base 200 in a direction perpendicular to the depth of the seat. A set of linkage arms 275 are connected to threaded collars 274 at both ends of the rod 270. The collars 274 ride on threaded portions 272 of the rod 270. At ends opposite to the collar 274 the linkage arms 275 are secured together at a pivot point 276 and fixed to one of the front portion 210 or rear portion 220 of the seat base. FIG. 14 shows the arms 275 connected to the front portion of the seat base.

The rod 270 passes through a slot in the front portion 210 and is rotatably fixed to the rear portion 220 of the base 200 to allow movement of the front portion 210 and rear portion 220 of the seat base 200 relative to one another. Rotation of either handle 271 turns the threaded portions 272 of the rod and creates corresponding movement of the collars 274 and the attached 275. The arms 274 are fixed to the portions of the seat base at pivot points 276. Therefore, rotation of the threaded portion 272 drives the arms 275 inwardly or outwardly creating a corresponding movement of the front portion 210 of the seat base. For example, if the handle 271 is rotated such that the arms 275 are drawn toward the middle of the seat base 200, the front portion 210 of the seat base moves away from the rear portion 220 creating a larger seating surface.

In yet another alternative embodiment, the connection between the arms 275 and one of the portions of the seat base may be omitted. For example, the rod 270 may be rotatably connected to the rear portion 220 of the seat. The connection between the arms 275 and the rear portion 220 of the seat may be omitted. Thus, rotation of the handle 271 creates a movement of the front portion 210 of the seat either away from or toward the rear portion 220. FIG. 14 represents an exemplary embodiment. Thus, as mentioned above, it is clear that the front portion 210 may pass outside the rear portion 220 rather than inside as shown in the drawing.

Figure 15:
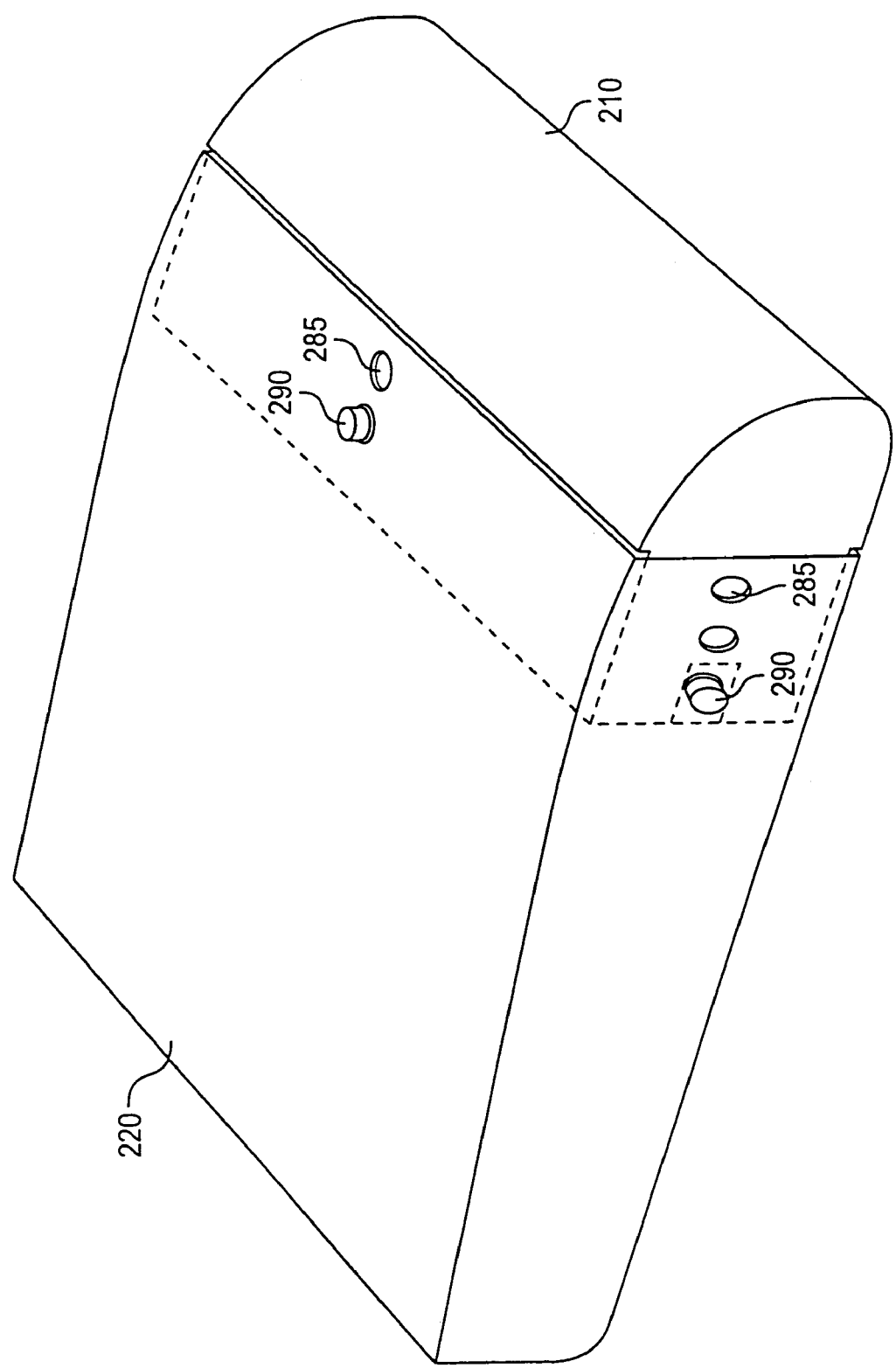
FIG. 15 is a perspective view of an adjustable seat base according to yet another embodiment of the present invention.

Another alternative embodiment of the seat base 200 is shown in FIG. 15. The front portion 210 of the seat base slips into the rear portion 220. The front portion may include an upwardly biased push button 290 extending upward through one of a series of holes 285 located in the rear portion 220 of the seat. As shown in FIG. 15, the push button may be located either on the side or on the top of the seat base. Any number of holes 285 may be provided in the rear portion 220 depending on the amount of the seat adjustment desired. FIG. 15 merely discloses two of many possible alternatives (i.e., two or three holes). As mentioned above, the front portion 210 of the seat base may slide over rather than under the rear portion 220. In this alternative, the push button 290 would be provided on the rear portion 220, and the holes 285 would be formed in the front portion 210.

Figure 16:
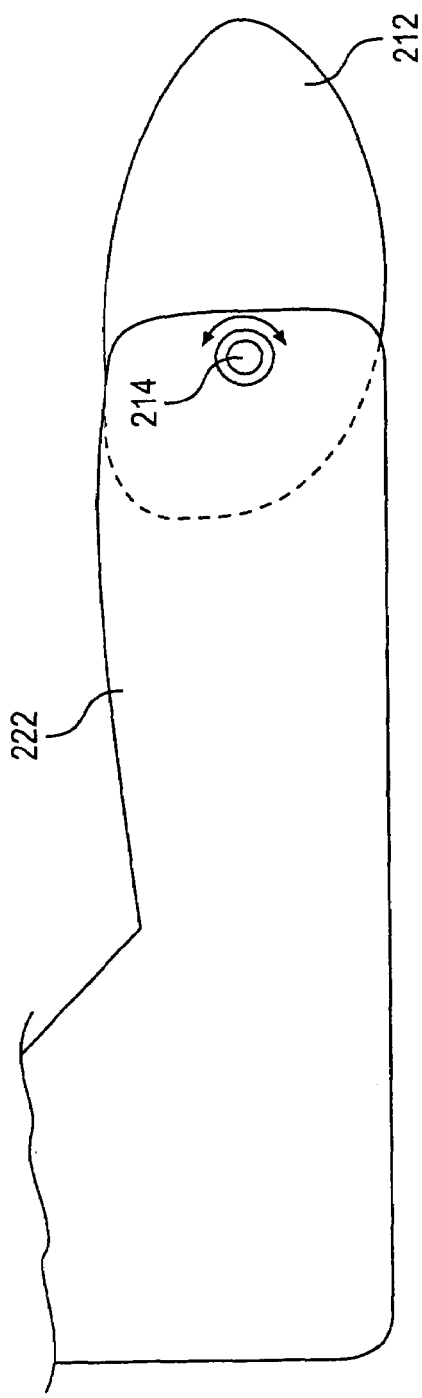
FIG. 16 is a side view of an adjustable seat base in an extended position according to yet another alternative embodiment of the present invention.
Figure 17:
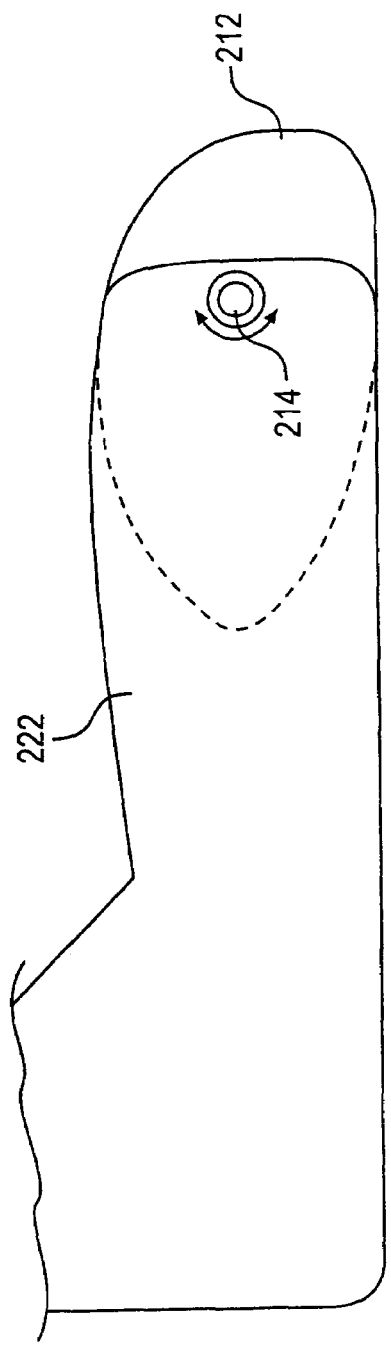
FIG. 17 is a side view of the adjustable seat base of FIG. 16 showing the seat base in the retracted position.

FIGS. 16 and 17 disclose yet another alternative of the seat base 200. As shown in the drawings, a front portion 212 of the seat base is pivotally connected to a rear portion 222 at a pivot point 214. FIG. 17 shows the seat base in a shortened position. When increased seat depth is desired, a handle located at the pivot point 214 is rotated to change the position of the front portion 212 to extend out from the rear portion 222 as shown in FIG. 16. Preferably, the front portion 212 rotates downwardly from the position shown in FIG. 17 in order to prevent interference with a smooth seating surface located at the top of the rear portion 222. The shape and configuration of the front portion 212 may be varied as necessary to provide maximum comfort to the user of the child seat.

As mentioned above, the present invention includes a child seat that may be used either with or without the backrest. The backless booster seat may include the features described above, such as, the object holder, adjustable armrests and seat base with depth adjustment.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A child seat for seating a child within a vehicle, comprising:

a base having a substantially vertical outer side wall, the outer wall defining a perimeter of a recess formed in the wall; and an object holder including a vertically elongated cavity for receiving and holding an object;

wherein the object holder is attached to the base and extends into the recess, the recess perimeter being sized to receive a portion of the cavity of the object holder such that the object holder is movable though the recess between an extended, in use position and a fully retracted, storage position;

wherein, when the object holder is in the fully retracted, storage position, the object holder can be retracted no further into the base, and a portion of the object holder extends beyond the outer side wall of the base and presents a gripping surface configured to be engaged so as to articulate the object holder from the fully retracted position to the extended position;

wherein the child seat is configured for placement on a seat of the vehicle, and wherein the child seat has a belt path configured to receive and locate relative to the child a lapbelt of a restraint system of the vehicle.

2. The child seat of claim 1, wherein the object holder is slidably attached to the base.

3. The child seat of claim 1, wherein the base further comprises a seating surface and the object holder includes an extension slidably connected to the base and positioned under the seating surface.

4. The child seat of claim 3, wherein the extension includes a slot, and the base includes a post positioned in the slot to limit a sliding motion of the object holder.

5. The child seat of claim 3, wherein the cavity is at a distal end of the extension.

6. The child seat of claim 1, further comprising a second object holder attached to the base.

7. The child seat of claim 1, wherein the base further comprises a seating surface, and wherein when object holder is in the fully retracted, storage position, a portion of the cavity is located under the seating surface.

8. The child seat of claim 1, the object holder further comprising a perimeter that defines the cavity, wherein when the object holder is in the fully retracted, storage position, a portion of the cavity perimeter is received in the recess, and the received part of the cavity perimeter defines an aligned portion that is in vertical alignment with the recess perimeter.

9. The child seat of claim 8, wherein the substantial entirety of the received part of the perimeter is surrounded by the base.

10. The child seat of claim 8, wherein the aligned portion is surrounded by the recess perimeter.

11. The child seat of claim 1, wherein when the object holder is in the fully retracted position, a portion of the cavity of the object holder is in vertical alignment with the recess perimeter.

12. The child seat of claim 11, wherein the aligned portion of the cavity is surrounded by the recess perimeter.

13. The child seat of claim 1, wherein, when the object holder is in the fully retracted, storage position, a portion of the cavity is received within the recess.

14. A child seat for seating a child within a vehicle, comprising:
an object holder including a vertically elongated cavity for receiving and holding an object; and
a base including a recess sized to receive the object holder;
wherein the object is movable between an extended, in use position and a fully retracted, storage position;
wherein, when in the fully retracted, storage position, the object holder can be retracted no further into the base and a portion the object holder less than an entirety of the object holder extends beyond the base so as to be accessible as a gripping surface.

15. The child seat of claim 14, wherein the object holder is attached to a front portion of the base.

16. The child seat of claim 15, wherein the object holder comprises a first object holder, the child seat further comprising a second object holder movable independently of the first object holder between an extended, in use position and a fully retracted, storage position;
wherein, when in the fully retracted, storage position, the second object holder can be retracted no further into the base and a portion the second object holder less than an entirety of second-object holder extends beyond the base so as to be accessible as a gripping surface.

17. The child seat of claim 16 wherein the first and second object holders are attached to opposite sides of the base.

18. The child seat of claim 16 wherein the base further comprises a seating surface, and wherein when the first and second object holders are in their fully retracted, storage position, a portion of each of their cavities is located under the seating surface.

19. The child seat of claim 16 wherein when the object holders are in the fully retracted, storage position, a substantial entirety of the received part of their object holders is surrounded.

20. The child seat of claim 19, wherein the substantial entirety of the received part of the object holders is surrounded by the base.

21. A child seat for seating a child within a vehicle, comprising:
a base having first and second opposing, substantially vertical, outer side walls, the outer walls each defining a perimeter of a recess formed in each wall;
first and second object holders attached to the base corresponding to the first and second side walls, respectively, each of the first and second object holders including a vertically elongated cavity for receiving and holding an object, wherein the object holders are attached to the base and extend into the corresponding recesses, each recess perimeter being sized to receive a portion of the cavity of the object holder in the recess, and each object holder is movable through the corresponding recess between an extended, in use position and a fully retracted, storage position whereby each object holder can be retracted no further into the base and a portion of each object holder extends beyond the base and presents a gripping surface configured to be engaged so as to articulate the object holder from the fully retracted position to the extended position; and
a belt path configured to receive and locate relative to the child a lapbelt of a restraint system of the vehicle such that the child seat is configured for placement on a seat of the vehicle.

22. The child seat of claim 21, wherein when each object holder is in the fully retracted position, a portion of the cavity is in vertical alignment with the recess perimeter.

23. The child seat of claim 22, wherein the aligned portion of the cavity is surrounded by the recess perimeter.

24. The child seat of claim 21, wherein, when the object holder is in the fully retracted, storage position, a portion of the cavity is received within the recess.

25. A child seat for seating a child within a vehicle, comprising:
a base, the base having a recess extending into the base, the recess defined by an enclosed perimeter; and
an object holder including a vertically elongated cavity for receiving and holding an object;
wherein the object holder is attached to the base and extends into the recess, the recess perimeter being sized to receive a portion of the cavity of the object holder such that the object holder is movable through the recess between an extended, in use position and a fully retracted, storage position;

wherein, when the object holder is in the fully retracted, storage position, the object holder can be retracted no further into the base, and a portion of the object holder extends beyond the recess and presents a gripping surface configured to be engaged so as to articulate the object holder from the fully retracted position to the extended position;

wherein the child seat is configured for placement on a seat of the vehicle, and wherein the child seat has a belt path configured to receive and locate relative to the child a lapbelt of a restraint system of the vehicle.

26. The child seat of claim 25, wherein when each object holder is in the fully retracted position, a portion of the cavity is in vertical alignment with the recess perimeter.

27. The child seat of claim 26, wherein the aligned portion of the cavity is surrounded by the recess perimeter.

28. The child seat of claim 25, wherein, when the object holder is in the fully retracted, storage position, a portion of the cavity is received within the recess.

* * * * *

UNITED STATES PATENT AND TRADEMARK OFFICE
CERTIFICATE OF CORRECTION

| | | |
|---|---|---|
| PATENT NO. | : 7,278,683 B2 | Page 1 of 1 |
| APPLICATION NO. | : 10/691618 | |
| DATED | : October 9, 2007 | |
| INVENTOR(S) | : Bruce Williams et al. | |

It is certified that error appears in the above-identified patent and that said Letters Patent is hereby corrected as shown below:

Title Page

Paragraph 56 References Cited

Page 2 - Foreign Patent Documents

DE 55 29 698 A2 11/95 should be deleted and DE 44 18 587 A2 11/95 should be added.

GB 2 298 655 should be changed to GB 2 296 655.

Signed and Sealed this

First Day of April, 2008

JON W. DUDAS
*Director of the United States Patent and Trademark Office*